United States Patent Office 3,284,992
Patented Nov. 15, 1966

3,284,992
HYDROGEN CHLORIDE SEPARATION
Andrew O. Wikman, Baton Rouge, La., assignor to Ethyl Corporation, New York, N.Y., a corporation of Virginia
Filed Sept. 30, 1963, Ser. No. 312,736
6 Claims. (Cl. 55—48)

This invention relates to a novel process for the separation of hydrogen chloride from a gaseous stream containing hydrogen chloride. More particularly, this invention relates to a novel procedure for rapidly effecting separation between hydrogen chloride and a substantially water insoluble component contained in a gaseous stream.

Many procedures and processes utilized commercially for the substitutive chlorination of hydrocarbons or the thermal cracking of chlorinated hydrocarbons such as ethyl chloride contain substantial quantities of hydrogen chloride as an impurity in the product stream. Also oxychlorination procedures involving the reaction between an organic halogen acceptor such as ethylene, hydrogen chloride and air fail to consume the hydrogen chloride reagent quantitatively thereby resulting in a product stream containing varying quantities of hydrogen chloride. Accordingly, there exists a need in the art for an effective rapid and straightforward method for removing this contaminant. Water-quench systems are known and have been proposed but possess as a disadvantage the necessity of stripping columns and moving mechanical parts such as pumps.

It is accordingly a chief object of this invention to provide the art with a novel aqueous scrubbing technique or process which involves no moving parts and no stripping columns or the like and which efficiently and rapidly removes hydrogen chloride from a gaseous stream.

These and other objects are accomplished by the process fully described by the following description, the appended claims and the figures in clear schematic representation.

Figure 1:
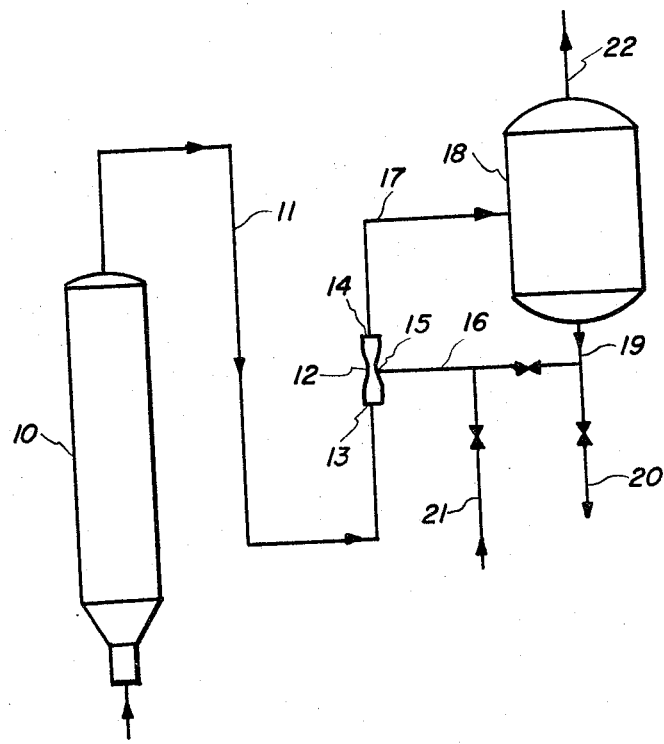
Figure 2:
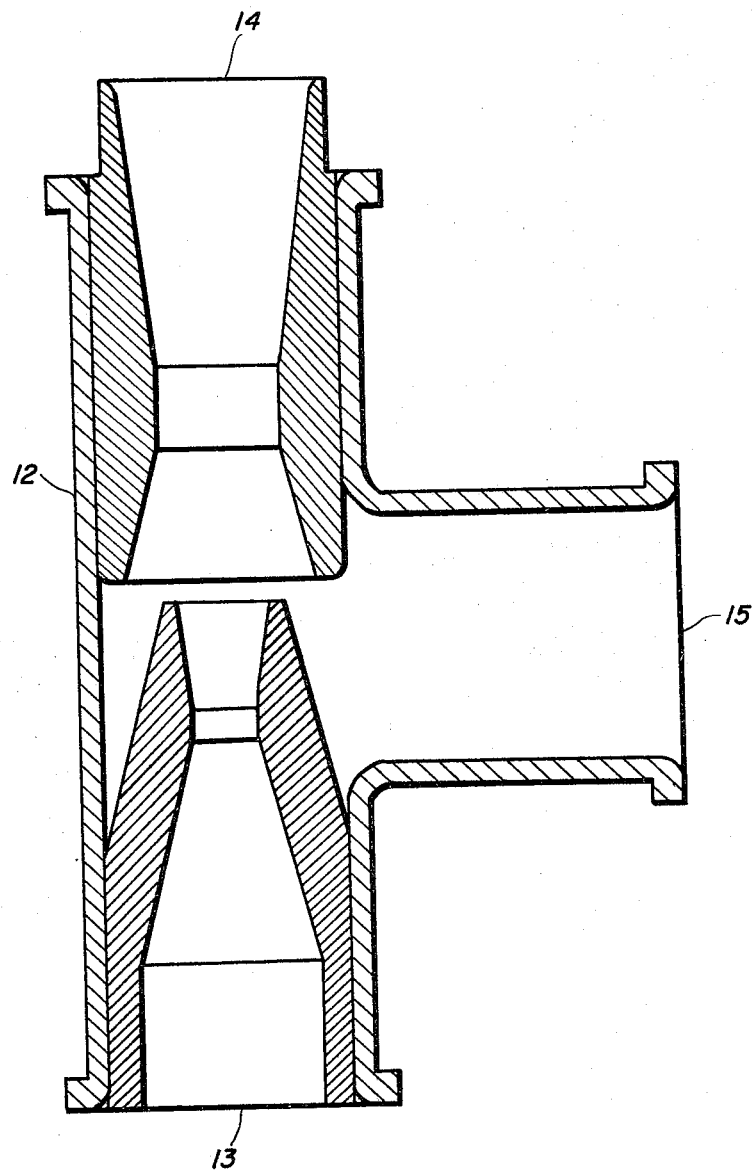

Referring to the FIGURE 1: vessel 10 is illustrative of a reactor of any sort such as a thermal cracker, a chlorinator, or an oxychlorination reactor. This reactor may contain a catalyst in the form of either a fixed or fluidized bed, packing or other heat transfer media. The product gases from such a reactor, contain as a product a water insoluble component such as ethylene dichloride, ethylene or other substantially water insoluble component together with hydrogen chloride, are passed from reactor 10 through line 11 into the constricted area 12. This constricted area 12 may be formed in a wide variety of manners such as by an orifice plate or a valve. Most preferably this constricted area is constructed similar to a Venturi tube having an internal surface composed of two truncated cones separated by a relatively narrow throat. The most preferred design for the Venturi tube means is set forth schematically in FIGURE 2. It is seen from FIGURE 2 that the preferred Venturi is composed of two opposed flaring nozzles separated by a narrow space. The gaseous stream passes through the Venturi tube through the effluent entry port 13. The constricted area or Venturi tube is provided with an aqueous liquid entry port 15 placed substantially at the throat of the Venturi. An aqueous liquid enters into the throat of the Venturi through the liquid entry port 15 thereby forming a two-phase liquid gas dispersion of the gaseous stream and the aqueous liquid. The entry of the aqueous liquid into the throat is effected by the pressure drop of the gaseous stream as it passes through the throat of the Venturi. The aqueous liquid entering through port 15 may be pure water or it may be water containing small amounts of salts, acids and the like. The aqueous liquid or water may contain hydrogen chloride itself in relatively small quantities however the exact amount is limited only by the equilibrium conditions between hydrogen chloride and water which exists under the conditions of the particular process involved. If desired, a base or caustic such as sodium hydroxide, potassium hydroxide, or the like may be added to the aqueous liquid. The two-phase liquid gas dispersion formed substantially at the throat of the Venturi passes out of the Venturi through port 14, i.e. the dispersion outlet port, and through line 17. The dispersion is then passed into vessel 18. This vessel can be any hollow cylindrical steel drum, its particular design and shape being of little consequence. This vessel should be lined with a material which is substantially resistive to hydrochloric acid corrosion. This can be provided by lining the vessel with glass, polytetrafluoroethylene, or the like. When a caustic such as sodium hydroxide is added to the aqueous liquid a special lining may become unnecessary in that the hydrogen chloride which dissolves in said liquid will be immediately neutralized.

The dispersion entering into vessel 18 separates into two phases. The hydrogen chloride thus initially contained in the gaseous stream from reactor 10 is now substantially contained in the liquid phase. The gaseous phase which contains substantially all of the substantially water insoluble component, e.g. ethylene dichloride, is recovered through line 22. In an especially preferred embodiment of this invention a portion of the liquid phase is recycled through line 19 and line 16 so as to provide the aqueous liquid which is injected through the liquid inlet port 15. This can be effected by manipulating valves shown in FIGURE 1. Line 21 represents a line which may be used as the source of the aqueous liquid or when the preferred embodiment, i.e. the recycle, is used it may be employed only for makeup liquid. Line 20 represents the drain for reactor 19.

When desired a second scrubbing stage (not shown in the figures) can be employed by passing the gaseous effluent from line 22 through a second Venturi tube means essentially similar to that depicted in the figure forming a dispersion which is then injected into a drum to separate the phases. The liquid phase is then preferably recycled to the throat of the Venturi. When a second stage is employed in this manner it is frequently desirable to employ a small amount, e.g. 1 to 10 weight percent, of sodium hydroxide in the aqueous liquid which passes into the throat of the Venturi tube. The second scrubbing vessel is most desirably constructed in the same manner as the vessel 18 however as a general rule and especially when the caustic is employed in the aqueous liquid the inert lining may be dispensed with and a simple steel vessel employed.

In order that those skilled in the art may better understand the process of the present invention the following examples are given by way of description and not by way of limitation.

*Example I*

Ethylene, hydrogen chloride and air were premixed in approximately stoichiometric proportions and fed into the bottom of a reaction vessel corresponding to vessel 10. This vessel was a vertical steel tubular reactor having a reactant entry port at the bottom and a product recovery port at the top. The vessel had been previously charged up to about 5 feet with a fluidized oxychlorination catalyst. The catalyst was composed substantially of copper chloride deposited upon an inert fluidized support. The reagents, i.e. the ethylene, hydrogen chloride and air, were fed into the bottom of the reactor at approximately one standard cubic foot per minute. The temperature of the reaction was maintained from about 150° C. to about 200° C. and the pressure maintained from about 75 pounds per square inch gauge to about 125 pounds per square inch gauge. The gaseous effluent was drawn off the top of the reactor in a glass lined pipe corresponding to line 11. This gaseous product stream was composed of ethylene dichloride (the desired product), nitrogen and unreacted hydrogen chloride in a concentration of about 6.5 percent by weight. This stream was passed through a standard Venturi tube corresponding to 12 of the FIGURE 2. Water was injected into the throat of the Venturi tube and the dispersion so formed passed out of the tube through a pipe corresponding to line 17 and into a vessel corresponding to 18. Two phases separated within the vessel, the gas phase containing substantially all of the desired ethylene dichloride product and the aqueous phase containing substantially all of the hydrogen chloride. The gaseous phase was passed out of a line corresponding to line 22 and was found to contain only about 0.005 percent by weight of hydrogen chloride. A portion of the liquid phase in the vessel was recycled into the throat of the Venturi tube to provide the aqueous liquid.

In this example a second stage was used, that is, the product stream from the separation vessel was passed through a second Venturi tube where it was contacted with an aqueous liquid in a manner substantially the same as in the first stage. However the aqueous liquid in the second stage contained about 4 percent sodium hydroxide. The dispersion passed into the second vessel wherein two phases again separated. The product stream was drawn off the vessel in the gaseous phase and contained no hydrogen chloride. A portion of the liquid phase was recycled into the throat of the Venturi to provide the aqueous liquid.

*Example II*

Into a thermal cracking unit is charged ethyl chloride. The product stream contains ethylene and hydrogen chloride. This stream is passed through a Venturi tube which contains an aqueous liquid inlet port at the throat. The aqueous liquid is passed into the stream and a two-phase dispersion is formed and this dispersion is passed into a glass lined vessel. Two phases separate within the vessel and the gaseous phase which contains ethylene substantially free of hydrogen chloride is recovered and the liquid phase which contains substantially all of the hydrogen chloride originally present in the gaseous product stream is recycled into the throat of the Venturi tube.

The procedure described above is repeated for the substitutive chlorination of methane, ethane, propane and ethyl chloride. Substantially all of the hydrogen chloride contained in the product stream is removed in each case.

It is understood that many embodiments of the above invention can be made without departing from the spirit and scope of the invention.

What I claim as new and desire to secure by Letters Patent of the United States is as follows:

1. A process for rapidly effecting separation between hydrogen chloride and a substantially water insoluble component, both contained in a pressurized gaseous stream, which process comprises:
   (1) passing said stream through a Venturi tube means;
      (a) said Venturi tube means having a gaseous stream entry port, a dispersion outlet port, and an aqueous liquid entry port substantially at the throat of said Venturi tube means;
      (b) passing an aqueous liquid into the liquid entry port at the throat of the Venturi so as to form a two-phase liquid-gas dispersion of said effluent and said aqueous liquid; the passing of said aqueous liquid into said throat being effected by the pressure drop of the effluent at said throat;
   (2) passing the so formed two-phase dispersion from said dispersion outlet port into a vessel wherein the two phases separate to form a body of settling liquid at a level above the Venturi throat to enable the settling liquid to flow down to said throat, the hydrogen chloride being substantially contained in the liquid phase and the gaseous phase being substantially free from hydrogen chloride, and
   (3) recovering the gaseous phase from said vessel.

2. The process of claim 1 wherein said water insoluble component is a chlorinated hydrocarbon.

3. The process of claim 1 wherein said water insoluble component is ethylene dichloride.

4. A process for rapidly and continuously effecting separation between hydrogen chloride and a substantially water insoluble component, both contained in a pressurized gaseous stream, which process comprises:
   (1) passing said stream through a Venturi tube means;
      (a) said Venturi tube means having a gaseous stream entry port, a dispersion stream outlet port, and an aqueous liquid entry port substantially at the throat of said Venturi tube means,
      (b) passing an aqueous liquid into the liquid entry port at the throat of the Venturi so as to form a two-phase liquid gas dispersion of said gaseous stream and said aqueous liquid; the passing of said aqueous liquid into said throat being effected by the pressure drop of the gaseous stream at said throat,
   (2) passing the so formed two-phase dispersion from said dispersion outlet port into the vessel wherein the two phases separate to form a body of settling liquid at a level above the Venturi throat to enable the settling liquid to flow down to said throat, the hydrogen chloride being substantially contained in the liquid phase and the gaseous phase being substantially free from hydrogen chloride;
   (3) recycling at least the portion of the liquid phase from said vessel into the aqueous liquid entry port at the throat of the Venturi thereby providing the aqueous liquid; and
   (4) recovering the gaseous phase from said vessel.

5. The process of claim 4 wherein said water insoluble component is ethylene dichloride.

6. A process for rapidly effecting separation between hydrogen chloride and ethylene dichloride, both being contained in a pressurized gaseous stream, which process comprises:
   (1) passing said stream through a first Venturi tube of a double Venturi tube means,
      (a) said means comprising two Venturi tubes located in closely spaced axial relationship,
      (b) the first of said tubes having a constricted throat of smaller dimensions than the constricted throat of the second tube, and
      (c) each of said tubes having a flared entry port and flared exit port with the flared exit port of the first tube being smaller than the flared entry port of the second tube;
   (2) passing an aqueous liquid into the space surrounding and between the exit port of the first tube and entry port of the second tube, whereby
      (a) the pressure of said gaseous stream drops in passing from said first smaller tube to said second larger tube and
      (b) effects the admission of said aqueous liquid into said gaseous stream, thereby forming a two-phase liquid-gas dispersion of said gaseous stream and said aqueous liquid;
   (3) passing said two-phase liquid-gas dispersion through said second Venturi tube, whereby
      (a) said dispersion is compressed and
      (b) expelled from the constricted throat of the tube via said flared exit port, thereby effecting turbulence in the dispersion and intimate contact between said gas and liquid;

(4) passing the so formed two-phase dispersion into a vessel wherein the two phases are allowed to separate to form a body of settling liquid at a level above the Venturi throat to enable the settling liquid to flow down to said throat, the hydrogen chloride being substantially contained in the liquid phase and the gaseous phase being substantially free from hydrogen chloride;

(5) continuously recycling the liquid phase back to the space surrounding and between the exit port of the first tube and entry port of the second tube; and (6) recovering the gaseous phase from said vessel.

References Cited by the Examiner

UNITED STATES PATENTS

| | | | |
|---|---|---|---|
| 2,127,571 | 8/1938 | Pardee | 55—71 |
| 2,252,536 | 8/1941 | Wiley | 55—71 |
| 2,519,531 | 8/1950 | Worn | 55—47 |
| 3,042,728 | 7/1962 | Hirsh et al. | 55—71 |

OTHER REFERENCES

The Merck Index, seventh edition, Merck & Co., Inc., N.J., 1960, RS 356 M524, page 428.

REUBEN FRIEDMAN, *Primary Examiner.*

C. N. HART, *Assistant Examiner.*